Dec. 31, 1957  S. HILLER, JR., ET AL  2,818,226
ROTARY WING AIRCRAFT FRAME CONSTRUCTION
Filed Nov. 20, 1951  2 Sheets-Sheet 1

INVENTORS
STANLEY HILLER JR.
HAROLD H. SIGLER
BY
ATTORNEY

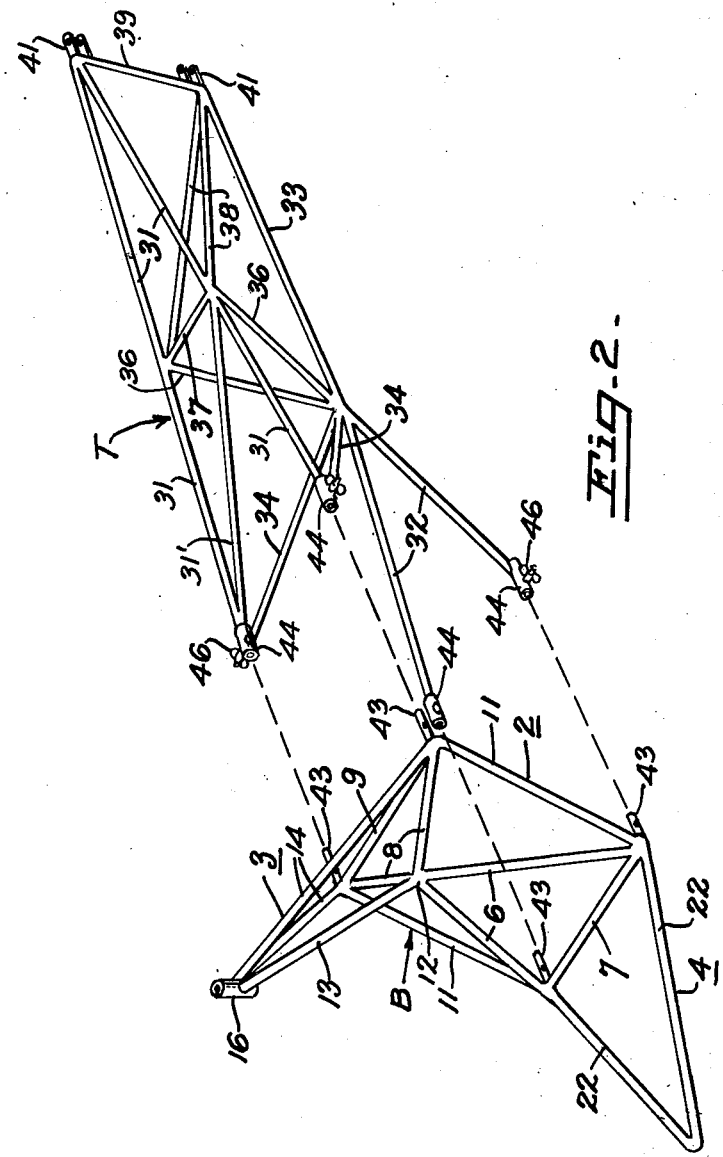

United States Patent Office 2,818,226
Patented Dec. 31, 1957

2,818,226

ROTARY WING AIRCRAFT FRAME CONSTRUCTION

Stanley Hiller, Jr., Atherton, and Harold H. Sigler, San Carlos, Calif., assignors to Hiller Helicopters, Palo Alto, Calif., a corporation of California Application November 20, 1951, Serial No. 257,351

4 Claims. (Cl. 244—120)

This invention relates to rotary wing aircraft; and more particularly to a light weight jet propelled helicopter frame construction.

An important advantage of a jet rotor propelled helicopter is its light weight by virtue of the absence of a heavy internal combustion engine as the power plant, the necessary gear trains and transmission mechanism which must be employed in conjunction with such engine, and mechanism for counteracting torque applied to the body of the helicopter. It is, therefore, desirable that the jet propelled ship be also, otherwise, of light construction. A type of jet propelled helicopter in which the construction of this invention has been found particularly advantageous, is disclosed in assignee's co-pending application by Stanley Hiller, Jr. and Harold H. Sigler, Serial No. 233,418, filed June 25, 1951, for "Rotary Wing Aircraft System," now Patent No. 2,761,635.

Summarizing this invention, it relates primarily to the provision of a light weight helicopter body and tail boom frame construction particularly for a jet propelled helicopter, wherein the tail boom is a unit that can be very readily connected or disconnected from a body unit to enhance portability of the ship for shipment or storage. Thus, the invention has as its objects, among others, the provision of an improved helicopter frame construction which is strong, simple and of light weight; and in which the tail boom unit can be readily disconnected from or attached to the body unit. Other objects of the invention will become apparent from a perusal of the following description:

Referring to the drawings,

Fig. 2 is an exploded isometric view of the body and the tail boom units in detached relationship.

Figure 1:
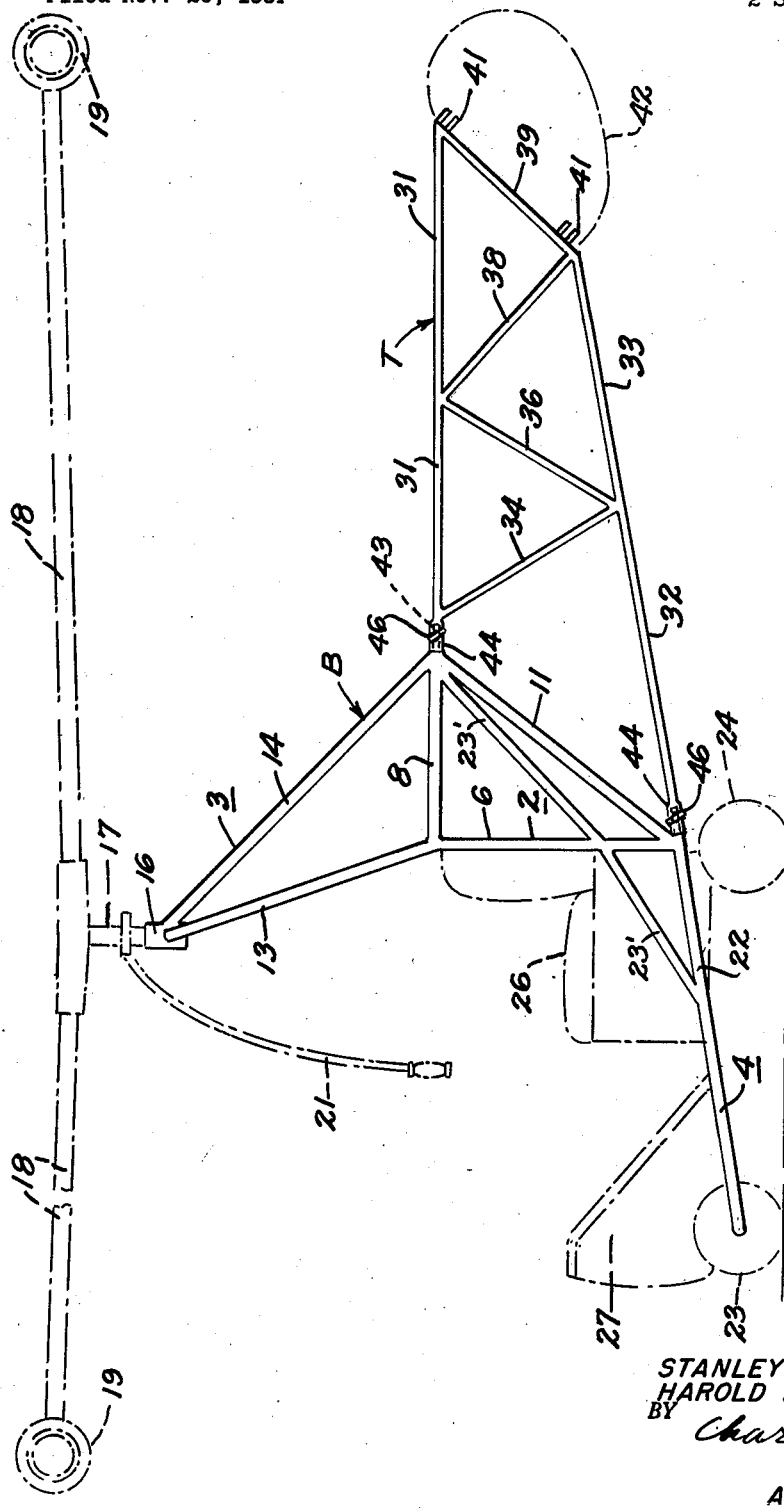
Fig. 1 is a side elevational view of the body and the tail boom units of the ship in assembled relationship and with the skin omitted; other portions of the ship being shown more or less schematically in phantom lines for purposes of illustration.

The body unit B comprises a framework formed of a plurality of tubular struts fixedly welded together in a rigid structure; the struts being of suitable light weight metal. The arrangement of these struts is such as to form three sections, namely, a main body portion 2, an upwardly extending and forwardly inclined pylon structure 3 supported by main body portion 2, and a lower pilot's station structure 4 extending forwardly from main body portion 2.

Main body portion 2 comprises a pair of front upright struts 6 forming a triangular frame with front bottom cross strut 7, a pair of top struts 8 forming a triangular frame with rear top cross strut 9, and upwardly extending rearwardly inclined side structs 11. Thus, the rear end of main body portion 2 has the shape of a quadrilateral with the upper end defined by strut 9 spaced rearwardly with respect to the lower end defined by strut 7; and the top front end of main portion 2 is at the junction 12 of the aforementioned triangular frames.

Pylon structure 3 comprises a single front strut 13 extending upwardly and inclined forwardly from junction 12, and also upwardly extending and forwardly inclined rear struts 14. The upper ends of struts 13 and 14 are fixedly connected to a sleeve 16 which provides a journal support for rotor column or mast 17 about the axis of which are rotatable rotor blades 18, as is disclosed more fully in the aforementioned co-pending application. Each of blades 18 has a jet propelled engine 19 on the tip thereof. An overhead pilot operable control stick 21 is manipulatable to control the cyclic pitch of the rotor blades in the manner disclosed and explained in the aforementioned copending application, through suitable cyclic pitch control mechanism, not shown herein. By constructing and mounting the pylon structure in the manner described, a simple but yet light weight structure obtains for support of the rotor blades; and the forward inclination of the pylon structure provides for proper balance of the ship when the rotor mechanism is supported thereby.

The pilot's station structure 4 comprises a pair of struts 22 extending forwardly from adjacent the ends of cross strut 7, and forming a triangular frame at the front end of which is mounted front landing gear wheel 23. Each of struts 22 is braced by lateral struts 23' (not shown in Fig. 2 for purposes of clarity). A spring type landing gear 24 is mounted under main body portion 2 adjacent cross strut 7. The landing gear is disclosed more completely, and claimed in assignee's co-pending application, by Stanley Hiller, Jr., Serial No. 202,769, filed December 26, 1950, for "Aircraft Landing Gear," now abandoned. Pilot's seat 26 is supported at the rear of structure 4; and cowling 27 is at the front.

Tail boom unit T is also formed of a framework of tubular metal struts all fixedly welded together but these struts are of lesser diameter than the struts of body unit B. Unit T has a quickly detachable telescopic connection with the rear of main body portion 2 of body unit B. For rigidity such telescopic connection should be at least three points; and in the preferred construction illustrated, it is at four points as will be described in detail hereinafter.

The top side of unit T is a triangularly shaped frame composed of top side strut members 31; the apex of such triangle being at the rear, and the base adjacent main body portion 2 of body unit B. The front struts 31 are braced by a diagonal strut 31'. At the bottom side, unit T has a front triangularly shaped portion formed by side struts 32, with the base thereof also adjacent main body portion 2. The apex of struts 32 are connected to single bottom strut 33. Upright forwardly inclined struts 34 connect the rear ends of struts 32 to the front ends of struts 31; and similar but rearwardly inclined upright struts 36 connecte the rear ends of struts 32 to a cross strut 37 connected between struts 31. To complete the assembly struts 38 are connected adjacent the ends of cross strut 37 and adjacent the rear end of strut 33; a single diagonal upright strut 39 being connected between the rear end of strut 33 and the rear junction of struts 31. Ears 41 are fixed adjacent the top and the bottom ends of strut 39 to provide for pivotal mounting of tail rudder 42 which is operated by the pilot in the manner disclosed in the aforementioned application, Serial No 233,418, now Patent No. 2,761,635.

For effecting the quickly attachable and detachable connection between body unit B and tail boom unit T at the four points previously mentioned, metal pins 43 extend rearwardly from the four corners of the rear of main body portion 2 of body unit B. Such pins are fixedly secured, preferably by welding, to body portion 2 and are adapted to telescope within four complementary metal sleeves 44 fixedly secured, preferably by welding, at the front end of tail boom unit T. The two units are detachably held together by conventional bolt and wing nut connections 46; a bolt extending through suitable apertures in each pair of telescoped sleeves 44 and pins 43, and a wing nut being screwed on each bolt and being held in position by any suitable lock washer or other locking means.

From the preceding, it is seen that tail boom unit T may be readily assembled onto body unit B by merely connecting four pairs of bolts and wing nuts. Such assembly can be readily disconnected in a reverse manner. Hence, the parts can be readily disconnected for shipment or storage purposes, and can be quickly attached together when this is desired.

We claim:

1. A rotary wing aircraft frame construction comprising a body unit composed of struts fixedly secured together and including a main body portion, an upwardly extending and forwardly inclined pylon structure supported thereby, and a lower pilot's station structure supported by and extending forwardly from said main body portion; a tail boom unit composed of struts fixedly secured together; the rear of said main body portion having the shape of a quadrilateral with its upper end spaced rearwardly with respect to its lower end; the top side of said tail boom unit being triangular in shape with the base of such triangle adjacent said main body portion, the bottom side of said tail boom unit having a rear portion composed of a single strut and a front triangularly shaped portion with the base thereof adjacent said main body portion; and detachable telescopic connecting means between said units at the four corners of said main body portion.

2. A rotary wing aircraft frame construction comprising a body unit composed of struts fixedly secured together and including a main body portion, an upwardly extending and forwardly inclined pylon structure supported thereby, and a lower pilot's station structure supported by and extending forwardly from said main body portion; a tail boom unit composed of struts fixedly secured together; the rear of said main body portion having the shape of a quadrilateral with its upper end spaced rearwardly with respect to its lower end; the top side of said tail boom unit being triangular in shape with the base of such triangle adjacent said main body portion, the bottom side of said tail boom unit having a rear portion composed of a single strut and a front triangularly shaped portion with the base thereof adjacent said main body portion; and detachable telescopic connecting means between said units at the four corners of said main body portion; each of said telescopic connecting means including a pin on one of said units, a sleeve on the other of said units, and a detachable bolt and nut connection between the sleeve and the pin.

3. A rotary wing aircraft frame construction comprising a main supporting body unit including a functionally integral framework consisting of an upwardly extending rotor column supporting pylon structure and a forwardly extending pilot's station structure, said body unit being free of structure providing any substantial portion of a tail boom; an independent rearwardly extending tail boom unit which is separable as a complete unit from said body unit; detachable connecting means between said units supporting said tail boom unit in cantilever fashion over the ground; said connecting means being located at the rear of said body unit; and landing gear means for said aircraft under said body unit adjacent the front and the rear thereof for providing stable fore and aft support of the body unit on the ground.

4. The construction of claim 3 in which said pylon structure is also forwardly inclined to balance the aircraft.

References Cited in the file of this patent

UNITED STATES PATENTS

| | | |
|---|---|---|
| 1,548,598 | Hall | Aug. 4, 1925 |
| 2,177,499 | Schairer | Oct. 24, 1939 |
| 2,487,646 | Gluhareff | Nov. 8, 1949 |
| 2,562,492 | Hall | July 31, 1951 |

FOREIGN PATENTS

| | | |
|---|---|---|
| 484,078 | France | June 9, 1917 |